United States Patent
Emmitt et al.

(10) Patent No.: US 11,214,401 B1
(45) Date of Patent: Jan. 4, 2022

(54) STACKABLE RACK FOR IRREGULARLY SHAPED PRODUCTS

(71) Applicant: Amazon Technologies, Inc., Seattle, WA (US)

(72) Inventors: James Dore' Emmitt, Seattle, WA (US); Peter A. Grant, Seattle, WA (US); Sriram Radhakrishnan, Bellevue, WA (US); Jeffrey Stephen Rebmann, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/894,122

(22) Filed: Feb. 12, 2018

(51) Int. Cl.
| | | |
|---|---|---|
| *B65D 19/38* | (2006.01) | |
| *B65G 1/02* | (2006.01) | |
| *A47B 87/02* | (2006.01) | |
| *A47B 47/00* | (2006.01) | |
| *A47B 47/02* | (2006.01) | |

(52) U.S. Cl.
CPC ............. *B65D 19/385* (2013.01); *B65G 1/02* (2013.01); *A47B 47/0091* (2013.01); *A47B 47/021* (2013.01); *A47B 87/0207* (2013.01); *B65D 2519/00024* (2013.01); *B65D 2519/0086* (2013.01); *B65D 2519/0094* (2013.01); *B65D 2519/00233* (2013.01); *B65D 2519/00796* (2013.01); *B65D 2519/00965* (2013.01)

(58) Field of Classification Search
CPC ........ B65D 19/385; B65D 2519/00024; B65D 2519/0094; B65D 2519/00965; B65D 2519/00796; B65D 19/44; B65G 1/02; A47B 47/021; A47B 47/0091; A47B 87/0207; A47B 87/0215
USPC ...... 211/194; 108/53.3, 53.5, 55.1; 206/505, 206/511, 512
See application file for complete search history.

(56) References Cited

U.S. PATENT DOCUMENTS

| | | | | |
|---|---|---|---|---|
| 2,732,967 | A * | 1/1956 | Metcalf ................. | B65D 19/12 220/6 |
| 2,922,530 | A * | 1/1960 | Skeppstedt .......... | B65D 19/385 108/53.5 |
| 2,988,313 | A * | 6/1961 | Ellison ................. | B65D 19/385 108/53.5 |
| 3,762,343 | A * | 10/1973 | Thacker ................ | B65D 19/38 108/53.3 |
| 4,191,112 | A * | 3/1980 | Maldonado ........... | B65D 19/08 108/53.3 |
| 4,266,678 | A * | 5/1981 | Daly ................... | A47B 87/0215 211/194 |
| 4,591,065 | A * | 5/1986 | Foy .................... | B65D 11/1833 206/509 |
| 4,773,547 | A * | 9/1988 | Bell .................... | A47B 87/0215 108/53.1 |
| 4,934,636 | A * | 6/1990 | Orlosky ................ | B65B 67/12 211/194 |
| 5,154,310 | A * | 10/1992 | Massey ................ | B65D 19/44 108/53.3 |
| 5,292,012 | A * | 3/1994 | Davis ................... | B60P 3/2205 211/85.18 |

(Continued)

*Primary Examiner* — Hiwot E Tefera
(74) *Attorney, Agent, or Firm* — BakerHostetler

(57) ABSTRACT

A welded steel rack has angular protrusions on the top that engage matching recesses on the bottom for stacking, and has offset front posts that form a flue gap when arranged side-by-side. A deck is perforated.

18 Claims, 4 Drawing Sheets

(56) References Cited

U.S. PATENT DOCUMENTS

| | | | | |
|---|---|---|---|---|
| 5,588,372 | A | * | 12/1996 | Kelly .................. B65D 19/385 |
| | | | | 108/53.1 |
| 5,638,973 | A | * | 6/1997 | Dewey ............... B65D 11/1873 |
| | | | | 206/509 |
| 6,123,208 | A | * | 9/2000 | Haenszel ............... A47B 45/00 |
| | | | | 108/55.1 |
| 6,213,315 | B1 | * | 4/2001 | Forney ................ B65B 69/0083 |
| | | | | 211/194 |
| D476,814 | S | * | 7/2003 | Thorpe .......................... D3/314 |
| 8,100,264 | B2 | * | 1/2012 | Wood .................... B65D 19/12 |
| | | | | 206/600 |
| 10,822,142 | B2 | * | 11/2020 | Zuzak .................... B65D 19/08 |
| 2005/0045639 | A1 | * | 3/2005 | Thorpe ................ B65D 19/385 |
| | | | | 220/495.01 |
| 2008/0226435 | A1 | * | 9/2008 | Patterson ............. B65D 88/542 |
| | | | | 414/377 |
| 2012/0134771 | A1 | * | 5/2012 | Larson ...................... B62B 3/02 |
| | | | | 414/800 |
| 2013/0145971 | A1 | * | 6/2013 | Federl ............... B65D 19/0059 |
| | | | | 108/57.25 |

\* cited by examiner

STACKABLE RACK FOR IRREGULARLY SHAPED PRODUCTS

BACKGROUND

In modern commerce, a vast number of items are handled and temporarily stored during the shipping. Conventional, commercially available racks on which products can be stored typically include a base with four posts that are attached by sitting them inside sockets in the base, which creates point loads on each post. Depending on the configuration, some commercial racks wobble and are not plumb within the ANSI recommendation of less than ½ inch per 10 feet in elevation.

Moreover, modern fire protection principles, such as those published by the National Fire Protection Association or Factory Mutual, encourage or mandate vertical space between adjacent racks to form a flue gap and porous materials for the flooring of the rack to encourage heat escape, which activates the ceiling mounted sprinklers, and for vertical water penetration.

Some of the vast number of different products that move through modern commerce, such as through modern fulfillment centers and the like, have shapes that are difficult to handle and store. Many products are difficult to convey or difficult to stack, and possibly easy to damage during handling, which products are referred to in this specification as "irregular" or "irregularly shaped." Some non-limited examples of irregular products include desk chairs, coils of 4-inch diameter drainage hose, industrial machinery, and the like.

DETAILED DESCRIPTION OF ILLUSTRATIVE EMBODIMENTS

Figure 1:
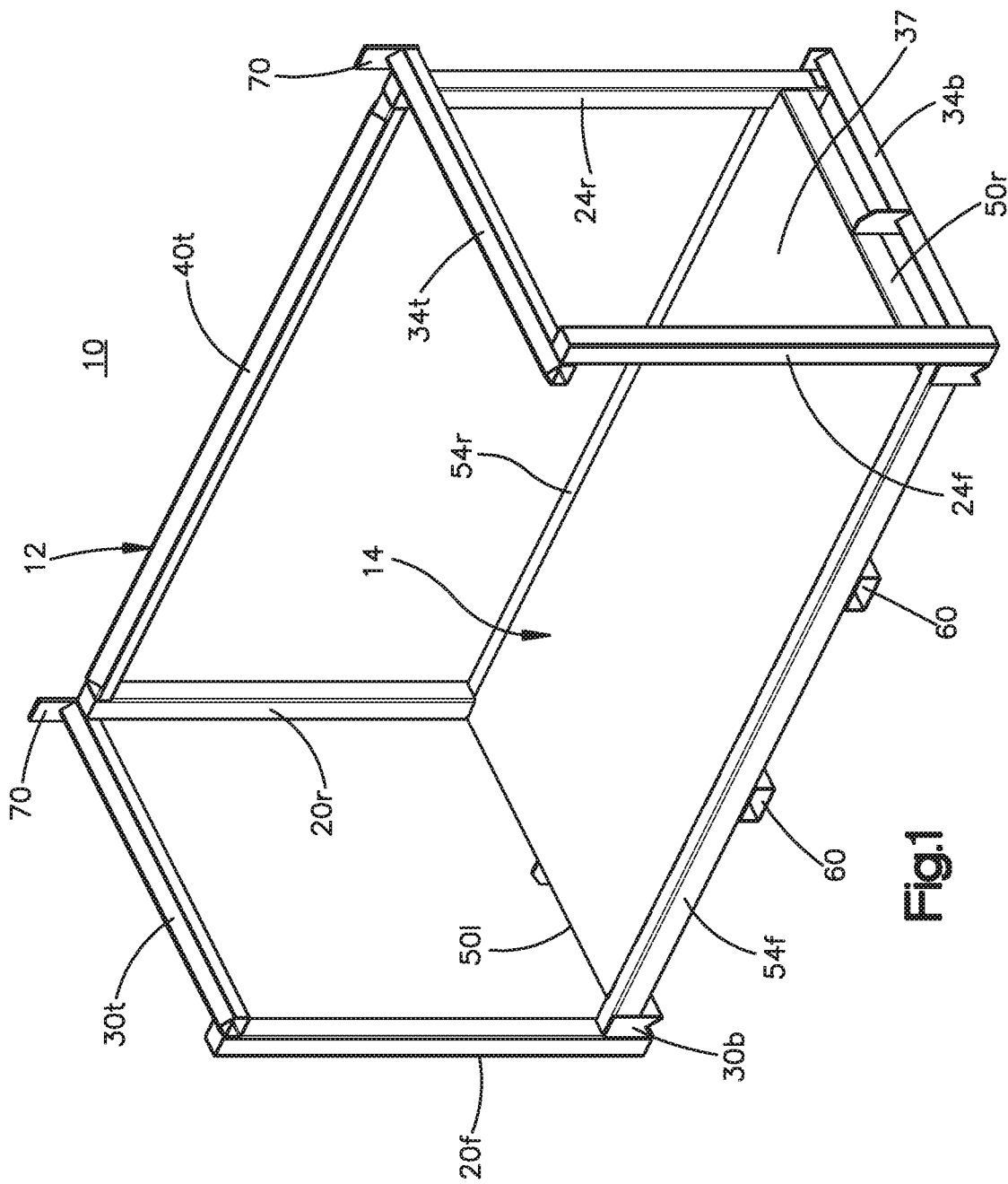
FIG. 1 is a top isometric perspective view of a rack illustrating aspects of the present invention.

A rack is described herein that is portable, stackable, and capable of handling irregularly shaped items (as that term is defined above). The rack is portable in that it can be transported by a forklift, lift truck, or like handling machinery. The rack is stackable in that it is capable of receiving an identical rack on top in a mating arrangement, without any additional structure between stacked racks, and without any structure (that is, other than the rack itself) to maintain the stability of the stacked racks. In this regard, the rack can be used to store irregularly shaped items and as a housing or container for the items during their processing in a warehouse, such as a fulfillment center.

The rack preferably is formed of welded steel tubing, and in the embodiment shown in the figures of ASTM 36 structural steel tube [that is, rectangular tubing]. The rack is configured to interlock with a rack above and below it in a stack, which promotes stability, improves the vertical alignment (that is, plumb), and preferably eases point loads.

In general, the rack has protrusions in the top and recesses in the bottom having a shape that matches the protrusions. The terms "protrusion" and "recess" refer to any structure that may be inserted into another. A protrusion engaged with a corresponding recess is referred to herein a fitment.

In the embodiments shown in the figures, the protrusions are angular shapes formed on top rails at the rear and sides of the rack and the recesses are angular shapes formed in the bottom rails at the rear and sides of the rack. The term "angular shape" is used herein to refer to the protrusions that are convex and recesses that are concave; each one of the convex protrusions and concave recesses, in transverse cross section, has a pair of opposing, straight, sloped sides that meet at an apex. The angular shapes preferably are formed by bending a flat bar or elongate plate to for form straight, sloped sides and an apex. The apex of the protrusion formed by bending has a rounded or filleted shape, and thus can rest inside the corresponding recess without interference.

Preferably, the side rails and their protrusions and recesses are continuous between the corresponding posts. In the embodiment shown in the figures, the base structure of the rear rails extends continuously between the posts while the protrusions and recesses are continuous but do not fully span the distance between the posts. Rather, the protrusions and recesses span the majority of the distance between the posts but do not extend to the posts to compensate for lack of visual acuity of the operator and to account for the possible hydraulic variability inherent in the lift truck. The angular shape is V-shape in transverse cross section. Front posts are laterally offset relative to the rest of the rack in an outboard direction such that lining up racks in contact with one another creates a six inch transverse flue gap between adjacent racks, which complies with fire safety in accordance with NFPA 13 guidelines. The flue gap is vertically continuous from floor to ceiling and the flue gap is not continuous from front to rear as it is interrupted by the front posts. Behind the front posts, the flue gap preferably is horizontally continuous unless interrupted by front posts of another rack.

Figure 2:
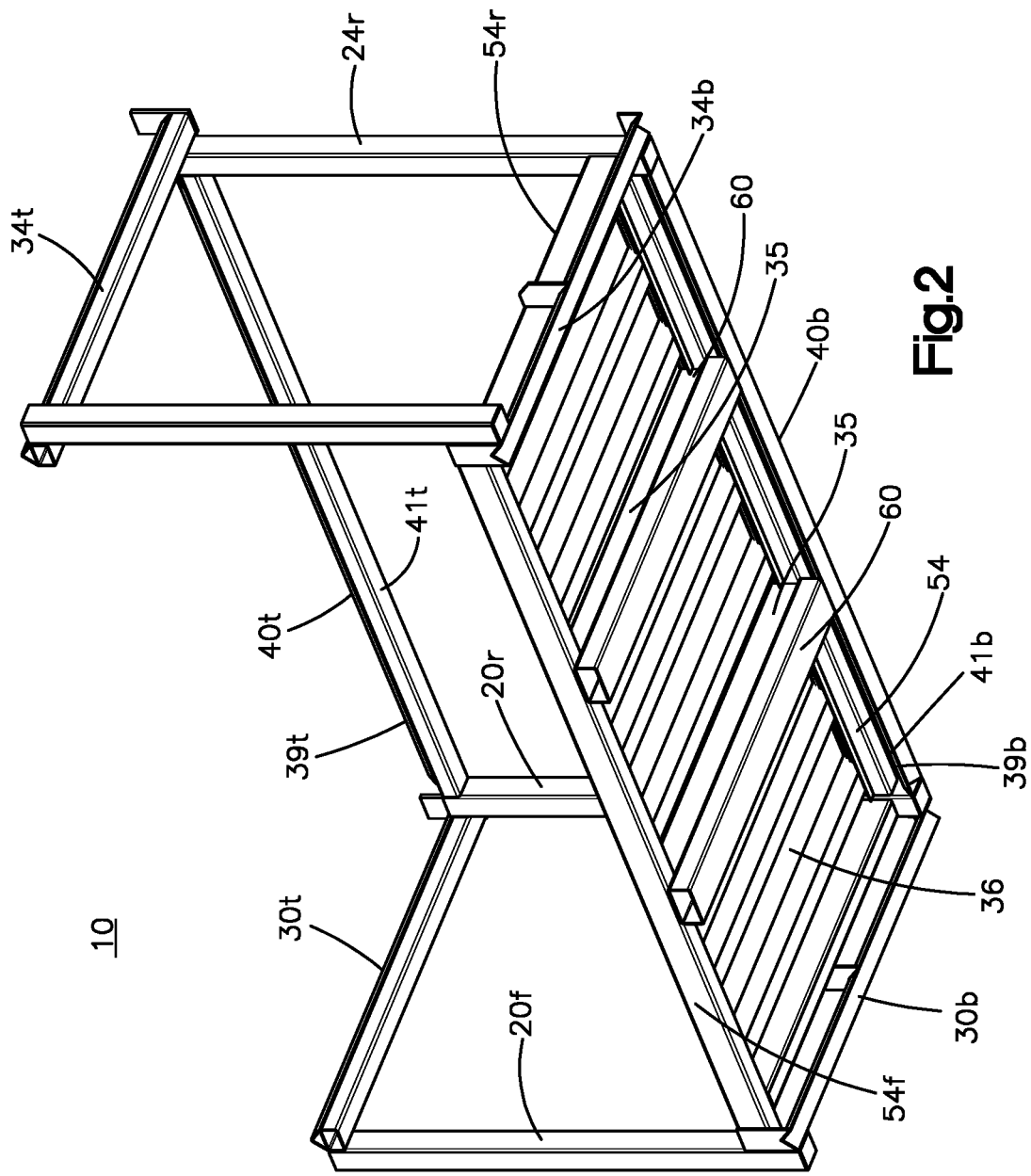
FIG. 2 is a bottom isometric perspective view of the rack of FIG. 1.

Referring to FIG. 1 and FIG. 2 to describe an embodiment, a rack 10 includes a structure 12 formed preferably of welded steel tubes and a deck 14. The structure includes upright posts that include a pair of front and rear left posts 20f and 20r and a pair of front and rear right posts 24f and 24r. The posts as illustrated in the figures are vertical. The terms "left" and "right" are as oriented as illustrated in FIG. 1 and used for convenience of illustration, and are not intended to be limiting.

A pair of bottom side rails 30b and 34b are oriented front to back and preferably are mutually parallel. Left bottom side rail 30b is connected (preferably directly connected via welding) to a lower end of front left post 20f and to a lower end of rear left post 20r. A pair of top rails 30t and 34t are oriented front to back and preferably are mutually parallel and parallel with the corresponding bottom side rails 30b and 30t. Preferably, the left side rails 30b and 30t are co-planar, and the right side rails 34b and 34t are co-planar.

A base portion 41b and 41t of a pair of rear rails 40b and 40t extends continuously between rear posts 20r and 24r. In the embodiment shown in the figures, each one of base portion 41b and 41t is a structural steel tube. The base portion 41b of rear bottom rail 40b extends between lower ends of rear rails 20r and 24r. The base portion 41t of rear top rail 40t extends continuously and fully between the upper ends of rear posts 20r and 334r. Rear rails 40b and 40t also include an angular recess 39b and angular protrusion 39a (respectively) that spans the majority of the distance between upper ends of rear rails 20r and 20t, and is left intentionally short for optimized fitment. In the embodiment of the figures, rear rail base portions 40b and 40t abut against posts 20r and 24f and are connected by welds.

Front posts 20f and 24f are laterally offset in an outboard direction. In this regard, left post 20f is left of or outside of bottom left side rail 30b and top left side rail 30t; and right post 24f is right of or outside of bottom right side rail 34b and top right side rail 34t. As explained herein, the outboard orientation of posts 20f and 24f form a transverse flue gap between racks when a rack 10 is placed next to another rack 10. Preferably, the outboard dimension is 3 inches, thereby forming a flue gap of 6 inches in accordance with NFPA guidance.

In the embodiment of the figures, rear posts 20r and 24r are inboard relative to front posts 20f and 24f In this regard, left rear post 20r is to the right of or inside of left bottom side rail 30b and left top side rail 30t; and right rear post 24r is to the left or inside of right bottom side rail 34t and right top side rail 34t. Thus, rear posts 20r and 24r and spaced apart by a dimension that is six inches less than the dimension of which front posts 20f and 24f are spaced apart. As explained below, the relative spacings of front posts 20f and 24f relative to rear posts 20r and 24f enable or promote the ability for stacking and nesting (for inactive storage) of racks 10.

Each one of top rails 30t, 34t, and 40t includes an upward-facing protrusion 80, which in the figures is angular-shaped. Each lower rail 30b, 34b, and 40b includes a downward-facing recess 82, which in the figures has an angular shape that matches the shape of the protrusion of the top rails. Protrusion 39a is an example of protrusion 80 and recess 39b is an example of a recess 82. Protrusions 80 and recess 82 may be formed by welding the formed steel angular shapes to rectangular steel tubes or by any other means. The present invention is not limited to a angular shape protrusions and recesses, but rather (for the claims that recite a protrusion) the present invention encompasses any shape of protrusion, including without limitation a tongue protrusion and a groove recess, unless expressly set out in the claims. A pair of stops 70 are located on opposing back corners of rack 10.

Deck 14 includes a pair of side left and right side deck rails 50l and 50r that extend front to back and a pair of front to back supports 35. Left deck side rail 50l is connected, preferably by welds, to left posts 20f and 20r. Right deck side rail 50r is connected, preferably by welds, to right posts 24f and 24r. Deck 14 also includes a front deck rail 54f and a rear deck rail 54r. Front deck rail 54f extends across the front of rack 10 and is welded between front posts 20f and 24f Rear deck rail 54r extends across the rear of rack 10 and is welded between rear posts 20r and 24r. Together rails 50l, 50r, 54f, and 54r, and 35 form a frame that supports decking 36. Preferably, decking 36 is corrugated secondary "B decking" sold by DACS, Inc. U.S. Pat. Nos. 6,401,944 and 7,156,243, which describe decking, are incorporated by reference herein. A punched or perforated surface 37 on top of decking 36 is smooth (that is, free from raised protrusions) such that products can slide on and off surface 37. The porosity of the decking 36, 37 preferably is greater than 70 percent, which aids in fire-suppression by enabling water, such as from sprinklers, or other fire suppression means to flow through the decking.

A pair of fork pockets 60 extend front to rear and open to the front to receive forks of a fork truck or like machinery. Fork pockets are connected, preferably by welds, to front and rear deck rails 54f and 54r.

Figure 3:
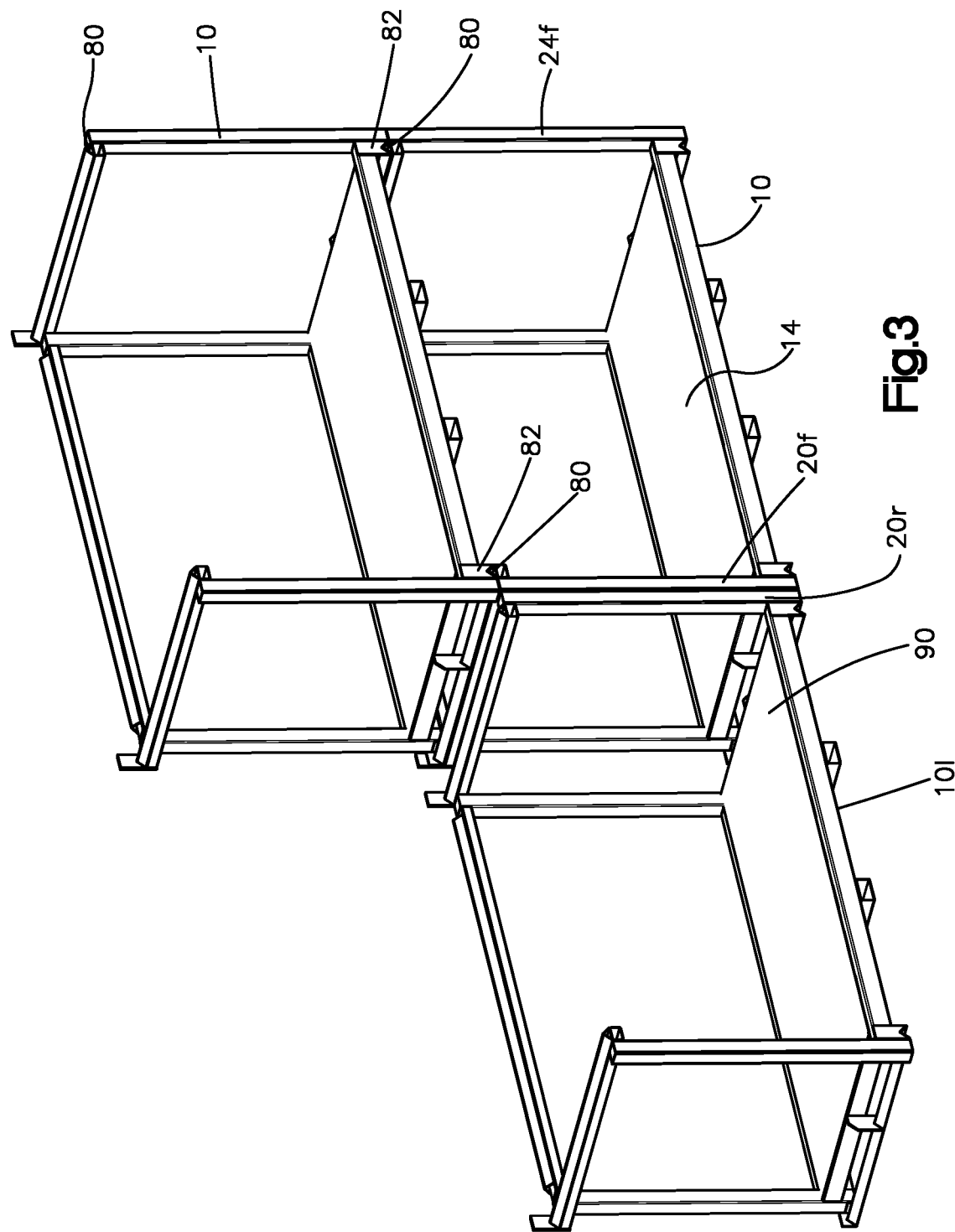
FIG. 3 is a perspective view of racks of FIG. 1 in a stacked and side-by-side configuration.

FIG. 3 illustrates a rack 10 stacked on top of another rack 10. A pair of opposing stops 70 (as best shown in FIG. 1) aid in the alignment of the racks. Protrusions 80 of top rails 30t, 34t, and 40 are engaged with (that is, reside in) recesses 82 of bottom rails 30b, 34b, and 40b. Because the angular shapes extend the length of the side rails and most of the span of the rear rails, the weight of the top rack is distributed on the bottom rack, which diminishes the point loads common with some prior art racks.

FIG. 3 also illustrates a pair of racks 10 located in side-by-side configuration. The outboard orientation of the front posts 20f and 24f are such that when side-by-side, the side rails and the deck of adjacent racks are spaced apart to form a transverse flue gap, which is indicated by reference numeral 90 in FIG. 9. Thus, racks 10 can be stacked on top of another, and can be positioned side-by-side for relatively dense packing of irregular products.

Figure 4:
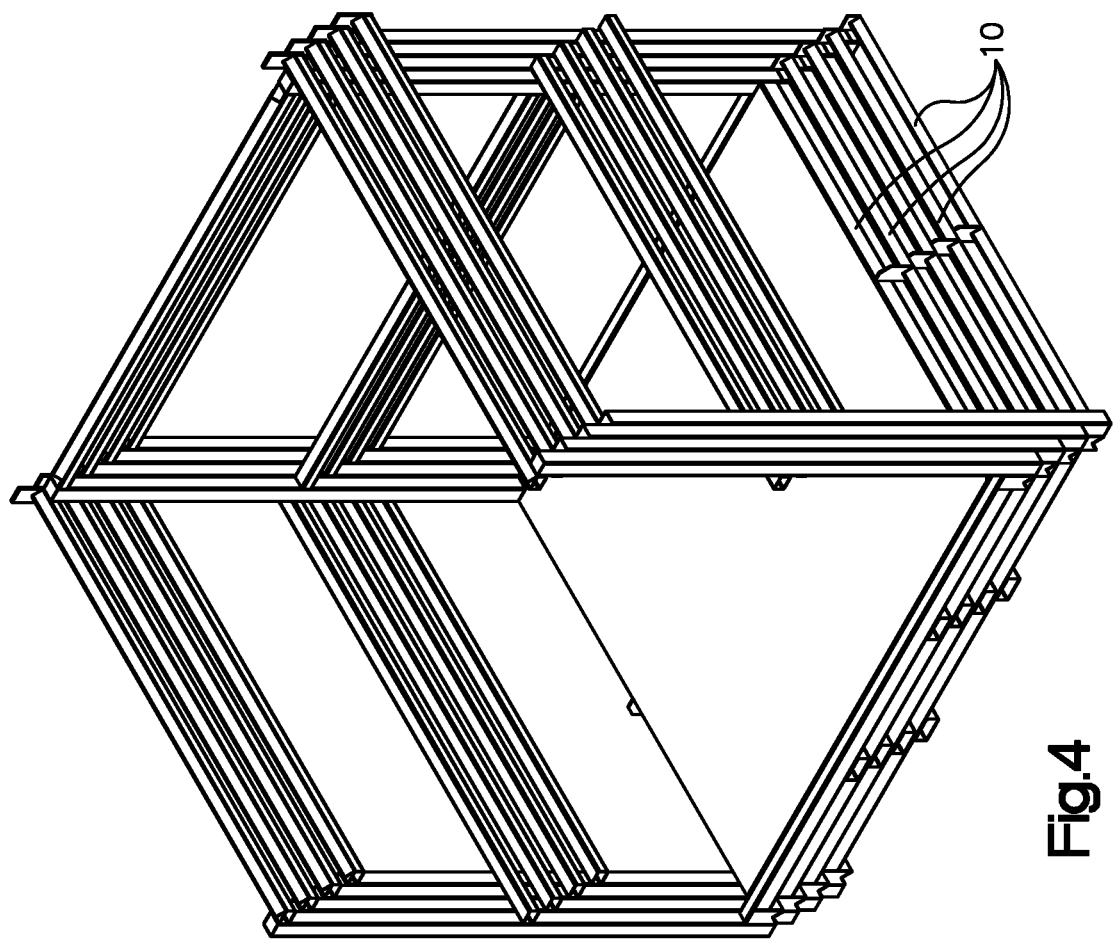
FIG. 4 is a view of the racks of FIG. 1 in a nested configuration.

Rack 10 having the structure described above can also nest within another rack 10. Referring to FIG. 4, the rear posts 20r and 24r are insertable between front posts 20f and 24f because of the offset configuration of the posts relative to the side rails, as described above. In this regard, a rack 10 can be slid into the front opening of another rack. The lack of a front rail enables nesting. In other words, a front opening is formed between the front posts 20f and 24f and a top opening is formed between the top rails 30t and 34t, and the openings are continuous (that is, without interrupting structure).

Rack 10 shown in FIG. 1 through FIG. 3 has approximate dimensions of 48 inches deep by 48 inches high by 96 inches long. FIG. 4 shows another convenient size of rack, which is approximately 48 inches by 48 inches by 48 inches.

In operation, a method for handling irregular products includes loading an irregular product onto decking 36 of a first rack 10, which in practice often occurs by manually sliding or rolling the product. A fork truck inserts its forks into fork pockets 60 to lift the rack 10. The first rack 10 is placed in a predetermined location, then a second rack 10 having another irregular product can be stacked on top of first rack 10. Third and fourth racks 10 can be placed side-by-side to the first and second racks such that the outboard configuration of the front posts form a transverse flue gap 90 the entire height of the stack of racks. As the stack of racks may be formed as high as the warehouse and fork truck equipment permit and rack structure permit, the flue gap 90 preferably extends the entire height of the stack of racks.

The racks can have identifying information, such as RFID tags, barcodes, and the like, such that when needed a fork truck can lift the desired rack can be moved to a desired location, such as a loading dock, for removal of the product by manual sliding or rolling, or by other means.

Preferably, the racks 10 are formed welding the tube steel components throughout. The racks may be in accordance with ANSI MH16.1, Specification for the Design, Testing, and Utilization of Industrial Steel Storage Racks, which is incorporated herein by reference.

The present invention is not limited to the specific structure disclosed herein, but rather encompasses any structure consistent with description and as defined by the claims when given their appropriate scope. Some advantages that flow from the structure are explained herein, but the present invention is not limited to the function or advantages unless the function or advantages are expressly set out in the claims.

What is claimed is:

1. A portable, stackable rack for irregularly shaped, unstackable, or easily damaged items, the rack comprising:

rear and side upper rails having convex, angular protrusions formed by sloped sidewalls meeting at an apex, the protrusion of the rear upper rail having opposing ends that are spaced apart from rear upright posts such that the protrusion on the rear upper rail spans the majority of the rear spacing width between the rear posts;

rear and side lower rails having angular recesses that are capable of receiving concave angular protrusions of another rack to promote stability upon stacking, the recesses formed by sloped walls meeting at an apex, such that the recesses are adapted for guiding the protrusions of another rack upon stacking;

a deck for supporting irregular objects;

a structural frame having front upright posts, the front posts being laterally offset outboard relative to the deck, wherein when the rack is placed inside contact with another rack, the front posts form a flue that extends past the height of the racks, and wherein the structural frame promotes nestability for storage of the racks, and wherein the deck spans the front posts and the rear posts and includes a perforated metal sheet without raised protrusions.

2. The rack of claim 1 further comprising a pair of fork pockets beneath the deck, each one of the fork pockets being configured for receiving a fork of a forklift.

3. The rack of claim 1 wherein the deck includes a support structure supported by the posts, a corrugated layer, and the perforated metal sheet forming a decking on the corrugated layer.

4. The rack of claim 1 wherein each one of the front posts is laterally offset from an outboard side edge of the deck.

5. A portable, stackable rack, the rack comprising:

a pair of rear upright posts and a pair of front upright posts, the front posts laterally, outwardly offset relative to the rear posts such that the front posts are mutually spaced apart by a front spacing width that is greater than a rear spacing width between the rear posts;

a bottom rear rail and a pair of opposing bottom side rails, the bottom rear rail spanning the rear posts and being supported by the rear posts, the bottom side rails being supported by the rear and front posts;

a top rear rail and a pair of opposing top side rails, the top rear rail spanning the rear posts and being supported by the rear posts, the top side rails being supported by the rear and front posts;

a deck spanning the front posts and the rear posts near a lower end of the rack, wherein the deck comprises a perforated metal sheet without raised protrusions; and one of the underside of the bottom rear rail and the topside of the top rear rail having a projection and the other one of the underside of the bottom rear rail and the topside of the top rear rail having a corresponding recess that upon stacking form a rear fitment, and one of the undersides of the bottom side rails and the topsides of the top side rails having a projection and the other one the undersides of the bottom side rails and the topsides of the top side rails having a corresponding recess that upon stacking form side fitments, the projection on one of the underside of the bottom rear rail and the topside of the top rear rail having opposing ends that are spaced apart from the rear upright posts such that the projection on one of the underside of the bottom rear rail and the topside of the top rear rail spans the majority of the rear spacing width between the rear posts;

wherein the rear fitment and side fitments promote stability upon stacking.

6. The rack of claim 5 wherein the projection of the rear fitment is an angular projection and the recess of the rear fitment is a matching angular recess that is adapted for guiding a projection of another rack upon stacking, and each one of the projections of the side fitments is an angular projection and each one of the recesses of the side fitments is a matching angular recess.

7. The rack of claim 5 wherein the angular projection of the rear fitment is located on the topside of the top rear rail and the matching angular recess of the rear fitment is located in the underside of the bottom rear rail, and the angular projections of the side fitments are located on the topside rail and the angular recesses of the matching angular recesses of the side fitments are located in the underside of the bottom rail.

8. The rack of claim 5 wherein the bottom and top rear rails extending continuously between the rear posts and the projection extends continuously between the rear posts, and the bottom and top side rails extend continuously between the corresponding rear and front posts, and the side fitments extend continuously between the rear and front posts.

9. The rack of claim 5 wherein a front opening is formed between the front posts and a top opening is formed between the top rails, the rack having no top front rail such that the front opening and top opening are continuous.

10. The rack of claim 9 wherein the rack is a first rack and further comprising a second rack, the first rack that the second rack is configured such that the second rack is nestable with the first rack.

11. The rack of claim 5 wherein the perforated metal sheet having a porosity of greater than 70 percent.

12. An array of racks having fire-safety features, the array of racks comprising a left lower rack and a right lower rack adjacent the left lower rack; and a left upper rack and a right upper rack adjacent the left upper rack; each one of the left lower rack, the right lower rack, the left upper rack and the right upper rack being the rack of claim 5, wherein the left lower rack is stacked on the left upper rack such each one of the projections is engaged with the corresponding recess;

the right lower rack is stacked on the right upper rack such each one of the projections is engaged with the corresponding recess; and a right one of the front upright post of the left lower rack contacting left one of the front post of the right lower rack, a right one of the front post of the left upper rack contacting a left one of the front post of the right upper rack, thereby forming a continuous flue spanning the entire height of the stacked racks.

13. The array of racks of claim 12 wherein each rack includes identifying information.

14. The array of racks having fire-safety features of claim 12 wherein the flue is at least 6 inches wide.

15. A method for handling irregular products comprising the steps of:

loading a first irregular product onto a first rack of claim 5;

loading a second irregular product onto a second rack of claim 5; and stacking the second rack on top of the first rack, whereby the protrusions of one of the first rack and second rack engage recesses of the other one of the first rack and the second rack to promote stability of the stack.

16. The method of claim 15 further comprising the steps of:

loading a third irregular product onto a third rack of claim 5 and placing the third rack adjacent to the first rack such a left one of the front posts of the third rack contacts a right one of the front posts of the first rack, thereby forming a flue between the decks of the second and third racks; and loading a fourth irregular product onto a fourth rack of claim 5 and stacking the fourth rack on top of the third rack, whereby the protrusions of one of the third rack and fourth rack engage recesses of the other one of the third rack and the fourth rack to promote stability of the stack, thereby forming a continuous flue between the first rack and the third rack and between the second rack and the fourth rack.

17. The method of claim 16 wherein each one of the stacking steps includes inserting forks of a fork lift into fork pockets of the racks.

18. The method of claim 16 further comprising the steps inserting forks of a forklift into pockets of one of the rack, moving the rack to an outbound dock, and removing the irregular product from the rack.

\* \* \* \* \*